(12) United States Patent
Weippert

(10) Patent No.: US 9,540,482 B2
(45) Date of Patent: Jan. 10, 2017

(54) LIGHT-CURING THERMOPLASTIC EPOXY RESIN ADHESIVE

(75) Inventor: Hans-Joachim Weippert, Aalen (DE)

(73) Assignee: Carl Zeiss Vision GmbH, Munich (DE)

( * ) Notice: Subject to any disclaimer, the term of this patent is extended or adjusted under 35 U.S.C. 154(b) by 928 days.

(21) Appl. No.: 12/209,907

(22) Filed: Sep. 12, 2008

(65) Prior Publication Data

US 2009/0071602 A1    Mar. 19, 2009

(30) Foreign Application Priority Data

Sep. 13, 2007    (DE) .................. 10 2007 043 559

(51) Int. Cl.
| | | |
|---|---|---|
| C08G 59/22 | (2006.01) | |
| C08G 59/62 | (2006.01) | |
| C08G 59/24 | (2006.01) | |
| C08G 59/68 | (2006.01) | |
| C08L 63/00 | (2006.01) | |
| C08L 61/16 | (2006.01) | |

(52) U.S. Cl.
CPC ............. C08G 59/62 (2013.01); C08G 59/24 (2013.01); C08G 59/687 (2013.01); C08L 63/00 (2013.01); C08L 61/16 (2013.01)

(58) Field of Classification Search
None
See application file for complete search history.

(56) References Cited

U.S. PATENT DOCUMENTS

| | | | |
|---|---|---|---|
| 3,450,613 A | | 6/1969 | Steinberg |
| 4,256,828 A | | 3/1981 | Smith |
| 4,318,766 A | | 3/1982 | Smith |
| 4,500,661 A | * | 2/1985 | Lakshmanan .................. 524/77 |
| 4,694,029 A | * | 9/1987 | Land ................................ 522/8 |
| 5,059,512 A | * | 10/1991 | Babich et al. .............. 430/280.1 |
| 5,200,451 A | * | 4/1993 | Wright .......................... 524/372 |
| 5,686,639 A | * | 11/1997 | Cohen ............................. 556/33 |
| 6,025,017 A | * | 2/2000 | Roth .............................. 427/146 |
| 6,043,295 A | | 3/2000 | Oxman et al. |
| 6,133,335 A | * | 10/2000 | Mahoney et al. ............... 522/29 |
| 6,268,403 B1 | | 7/2001 | Crivello |
| 6,432,490 B1 | * | 8/2002 | Rekowski et al. ............ 427/508 |
| 6,660,374 B2 | * | 12/2003 | Smetana et al. .............. 428/327 |
| 2002/0156190 A1 | * | 10/2002 | Sasaki et al. .................. 525/107 |
| 2004/0163556 A1 | * | 8/2004 | Kugo et al. .................... 101/226 |
| 2005/0171228 A1 | * | 8/2005 | Hatton .............................. 522/1 |
| 2006/0188820 A1 | * | 8/2006 | Maeda .......................... 430/311 |
| 2007/0123661 A1 | * | 5/2007 | Glockner et al. ............. 525/398 |

FOREIGN PATENT DOCUMENTS

| | | |
|---|---|---|
| DE | 26 39 395 A1 | 3/1977 |
| DE | 195 34 664 A1 | 3/1997 |
| DE | 10 2007 043 559 | 3/2009 |
| DE | 10 2007 063 698 B4 | 10/2010 |
| EP | 2 128 213 A1 | 12/2009 |
| WO | WO 94/08788 | 4/1994 |
| WO | WO 99/50711 | 10/1999 |

OTHER PUBLICATIONS

Crivello, J. et al., "Photoinitiated Cationic Polymerization of Epoxy Alcohol Monomers", Journal of Polymer Science: Part A: Polymer Chemistry 2000, 38, 389-401.*
Beloborodov, I. et al., "Effect of Hydrophobization of Powdered Fillers on Properties of Polymer-Based Composites", Powder Metallurgy and Metal Ceramics 2006, 45, 9-10, 429-431.*
Eastman Chemical Co., Piccotex 75 Hydrocarbon Resin, Retrieved from web on Dec. 22, 2015.*
08016062.5-2102 European Search Report, Jan. 16, 2009.

* cited by examiner

*Primary Examiner* — Richard A Huhn
(74) *Attorney, Agent, or Firm* — Price Heneveld LLP

(57) ABSTRACT

The present invention relates to a polymerizable composition comprising a cycloaliphatic epoxide compound, a monovalent alcohol, a photopolymerization initiator, wherein the molar ratio of the epoxide groups of the cycloaliphatic epoxide to the hydroxyl groups of the monovalent alcohol is 0.9:1.0 to 4.0:1.0 and the hydroxyl functionality of all organic compounds of the polymerizable composition having OH group(s) is in the range of 1.0 to 1.25.

20 Claims, No Drawings

LIGHT-CURING THERMOPLASTIC EPOXY RESIN ADHESIVE

FOREIGN PRIORITY CLAIM

This application claims priority under 119(a) to German Patent Application No. DE 10 2007 043 559.4, filed on Sep. 13, 2007, the disclosure of which is hereby incorporated by reference in its entirety.

The present invention relates to an adhesive formulation polymerizable by irradiation with a light source and its use for blocking or adhering optical components such as lenses or semifinished eyeglass blanks.

For processing optical components, e.g., grinding and polishing of semifinished blanks, they must be secured on a holder. This securing process is also known as "blocking."

A hot-melt wax or a low-melting metal alloy, e.g., an alloy based on bismuth, tin, cadmium, indium and antimony, is often used to secure the blank. Because of the low melting point, stress-free fixation is possible. However, use of such metal alloys constitutes an environmental and health risk.

Alternatively, the blank may be secured by an adhesive, but the following factors must be taken into account in general.

In adhering the optical component, such as a lens, to the holding device, there should be little or no stress because stress can have a negative effect on the optical quality. An adequate adhesive power and thus a stable fixation during processing of the optical element should be achieved within the shortest possible period of time. In addition, it is desirable for the adhesive power to remain as constant as possible during the processing and/or fixation and to be impaired only insignificantly by external factors such as atmospheric humidity or the action of coolants and/or polishing suspensions. After the processing operation is concluded, the adhesive should be removable as completely as possible without leaving residues on the optical surfaces.

For blocking and/or fixation of optical components such as lenses or semifinished blanks, in the past various adhesives have been used, but they have not been able to meet the totality of the requirements listed above.

In the case of hot-melt adhesives, heating of the parts to be cemented may lead to stresses and sometimes even to breakage of the glass. The heated parts must be thermally regulated for a lengthy time before processing.

Hot-melt adhesives are usually unsuitable for blocking optical components because they lead to a high stress in the workpieces which is usually not tolerated.

Cold cements based on peroxide-cured acrylates can lead to stresses because the curing reaction results in a highly exothermic temperature peak and these adhesives usually experience a high volume shrinkage in polymerization. Release of the adhesive bond is possible by swelling the hardened cement in polar solvent, but the polymer itself is largely insoluble. However, the dissolving times and the residues which often remain on the optical surfaces are usually unacceptable.

Cold cements based on epoxy resin with secondary diamines as hardeners yield adhesive bonds which are low stress and have a good stability with respect to conventional processing media in optics such as polishing suspensions. With these systems, the thermoplastic behavior and good solubility and solvents are advantageous. An important disadvantage of these cements is the long curing time of at least 24 hours at room temperature.

Releasable cement bonds implemented with UV-reactive acrylate adhesives (e.g., Loctite 3791) and/or with thiol-ene systems can be dissolved again by swelling the cured adhesive in hot aqueous solutions and/or polar solutions, resulting in a great reduction in adhesion. This effect is achieved by incorporation of polar and therefore water-swellable soft segments into the polymer matrix. The problem here is that this swelling effect can also be induced by atmospheric humidity. Therefore, with prolonged storage time of cemented optical parts, adhesion is reduced to such an extent that unintentional release may occur even during processing. The release times in hot water are unacceptable for large area bondings such as those with semifinished eyeglass blanks. In addition, with acrylate adhesives, the surface of the adhesive bond usually remains tacky, which is perceived as a nuisance (oxygen inhibition in curing with UV light). One disadvantage of thiol-ene systems is the definitely lower adhesion in comparison with acrylate adhesives and epoxy resins systems.

EP-A-0641281 discloses a method for securing a lens on a holding element using an adhesive based on a polymer resin having an acryl functionality on both ends.

U.S. Pat. No. 5,763,075 discloses a thermoplastic composition for securing tenses on the basis of caprolactone homopolymer or copolymer.

DE 2639395 discloses a photopolymerizable composition having a first organic material with an epoxide functionality of more than 1.5, a second organic material having a hydroxyl functionality of at least one and a photoinitiator. According to DE 2639395 a hydroxyl functionality which is definitely below 2 in combination with a molar ratio of epoxide to OH which is below 5:1, lead to the formation of hardened compounds having a low internal strength and tensile strength. According to the teaching of DE 2639395, the use of polyfunctional materials containing hydroxyl is therefore preferred.

Taking into account the disadvantages described above, the object of the present invention is therefore to replace the metal alloys that are harmful to the environment with a more environmentally friendly composition, whereby this composition allows fast low stress fixation of optical components such as lenses and problem-free, as much as possible, release of the optical elements at the end of processing. However, this must not be achieved at the expense of too little adhesive power or a decline in adhesive power during the processing time. Furthermore, the fully polymerized adhesive must be suitable for being processed, if necessary in mechanical processing of the cemented optical component without filling in the cracks of the tool with fines.

This object is achieved by providing a polymerizable component, comprising
 a cycloaliphatic epoxide compound,
 a monovalent alcohol,
 a photopolymerization initiator,
 wherein the molar ratio of the epoxide groups of the cycloaliphatic epoxide compound to the hydroxyl groups of the monovalent alcohol is 0.9:1.0 to 4.0:1.0, and
 the hydroxyl functionality of all organic compounds of the polymerizable composition having OH groups is in the range of 1.0 to 1.25.

As will be described in greater detail below, the inventive polymerizable composition allows polymerization which does not lead to a thermosetting high-molecular weight plastic material but instead results in a thermoplastic oligomer or thermoplastic low-molecular weight polymer which has a sufficient adhesion effect for good fixation of the optical element on the one hand while on the other hand having adequate solubility in polar solvents for easy release at the ends of processing.

Within the scope of the present invention, the term "polymerizable" also refers to the ability and/or suitability to be converted to an oligomer under suitable conditions.

A monovalent alcohol within the scope of the present invention is understood to be any molecule having only one OH group.

The term "hydroxyl functionality" is used in its conventional sense and denotes the average number of OH groups per molecule; this is obtained by dividing the total number of OH groups by the number of molecules having OH group(s). At a hydroxyl functionality of 1.0, the inventive polymerizable composition comprises exclusively monovalent alcohols, and at a value of more than 1.0, it also includes polyvalent alcohols.

Therefore, in the inventive composition, predominantly monovalent alcohols occur due to the hydroxyl functionality being in the range of 1.0 to 1.25, and there is only a small proportion of polyhydric alcohols (i.e., polyols). As a result, in a subsequent polymerization, i.e., curing of the polymerizable composition, formation of a thermosetting plastic is avoided and instead a thermoplastic oligomer and/or thermoplastic low-molecular weight polymer is obtained.

Since the molar ratio of the epoxide groups of the cycloaliphatic epoxide compound to the hydroxy groups of the monovalent alcohol is set at a value which is in the range of 0.9:1.0 to 4.0:1.0, a thermoplastic oligomer and/or polymer can be obtained by a subsequent polymerization such that on the one hand it has a sufficient adhesion effect for good fixation of the optical element, while on the other hand, it has adequate solubility in polar solvents for easy release at the end of processing.

The solubility (dissolving rate, thoroughness, residue behavior) of the cured auxiliary cement i.e., the material obtained after successful curing of the polymerizable composition, is influenced by the epoxy/hydroxy ratio. The closer this ratio is to 1:1, the better is the solubility. However, a satisfactory solubility property is still obtained if the molar ratio is in the range of 0.9:1.0 to 4.0:1.0.

By using a cycloaliphatic epoxide, a satisfactory reaction rate can be achieved in the subsequent photopolymerization.

In a preferred embodiment, the cycloaliphatic epoxide has at least one epoxide group per molecule, preferably two epoxide groups which are present in the form of an oxirane ring that is anellated on the cycloaliphatic ring. Preferred cycloaliphatic epoxides include, for example, 3,4-epoxy-cyclohexylmethyl-3,4-epoxycyclohexane carboxylate (e.g., Cyracure resin UVR-6110 from Dow Chemical), bis(3,4-epoxy-cyclohexylmethyl) adipate, 2-(3,4-epoxycyclohexyl-5,5-spiro-3,4-epoxy)cyclohexane-1,3-dioxane or mixtures thereof.

Within the scope of the present invention, cycloaliphatic epoxides having nanoscale oxides may also be used, e.g., Nanopox C620 (3,4-epoxycyclohexylmethyl-3,4-epoxycyclohexane carboxylate with approximately 40% $SiO_2$ nanoparticles), manufacturer Nanoresins AG. Monoepoxides and/or epoxides with just one reactive group (in cationic UV polymerization) are suitable for chain termination reactions in UV curing. In this context, cyclohexene oxide, vinyl cyclohexene dioxide, vinyl cyclohexene monoxide can be mentioned.

Mixtures of a cycloaliphatic diepoxide and cycloaliphatic monoepoxide may also be mentioned. The monoepoxide compound may act as a reactive diluent that reduces the viscosity of the composition. In a preferred embodiment, the molar ratio of diepoxide compound to monoepoxide compound is 1:1 to 10:1, more preferably 1:1 to 5:1, even more preferably 1:1 to 3:1.

The cycloaliphatic epoxide is preferably present in an amount of 20 to 80 wt %, more preferably 25 to 60 wt %, even more preferably 30 to 50 wt %, based on the total weight of the polymerizable composition.

The monovalent alcohol may be, for example, an alkanol, cycloalkanol, aryl alcohol, monoalkyl ether of polyoxyalkylene glycols or a monoalkyl ether of alkylene glycols.

The monovalent alcohol preferably has the general structure R—$(CH_2)_n$—OH where n is preferably 1 to 6, more preferably 1 to 2. Examples of R include alkyl, e.g., $C_1$-$C_{10}$ alkyl, cycloalkyl, e.g., cyclohexyl, aryl, alkoxy, e.g., O—$C_1$-$C_6$ alkyl or —O—$(CH_2-CH_2-O)_{1-4}$—O—$C_{1-6}$alkyl, —O—$(CH_2-CH_2-CH_2-O)_{1-4}$—O—$C_{1-6}$ alkyl and/or —O—$(CH_2-CH(CH_3)-O)_{1-4}$—O—$C_{1-6}$alkyl or any combinations of these radicals R.

For example, the following suitable alcohols can be mentioned: ethylene glycol monoalkyl ether, diethylene glycol monoalkyl ether, ethylene glycol monoaryl ether, diethylene glycol monoaryl ether or mixtures thereof Examples that can be used in this context include diethylene glycol monoethyl ether, ethylene glycol monophenyl ether and diethylene glycol monobutyl ether or any mixtures thereof. Other examples of alcohols include n-hexanol, n-octanol, methoxybutanol, ethylene glycol monobutyl ether, benzyl alcohol, TCD alcohol M (8-hydroxymetbyltri-cyclo(5.2.1.0/2.6)decane), cyclohexylmethanol, 2-cyclohexylethanol, 4-methoxybenzyl alcohol, hydroxyethyl salicylate.

The softening range and the solubility of the thermoplastic oligomer and/or low-molecular weight polymer, which is obtained from the polymerizable composition, can also be influenced by the chemical structure of the alcohol.

Polymers with a lower softening point are thus obtained with longer-chain monoglycol ethers. Alcohols having aromatic and/or cycloaliphatic structures, however, yield polymers with a higher softening point.

The water solubility of the alcohol component has an influence on the stability of the fully cured composition with respect to aqueous processing media in the subsequent optical processing. For example, diethylene glycol monoethyl ether is miscible with water at 20° C., ethylene glycol monophenyl ether has a water solubility of 10 g/L (20° C.), benzyl alcohol has a water solubility of 40 g/L (20° C.) and TCD alcohol M (8-hydroxymethyltricyclo(5.2.1.0/2.6)decane) has a water solubility of <1 g/L (20° C.). With longer processing times of optical components, e.g., in the field of lithography optics, it may be advantageous to use more hydrophobic alcohols such as ethylene glycol monophenyl ether, benzyl alcohol or TCD alcohol M, because this minimizes the water adsorption and thus unwanted swelling of the adhesive.

For special applications, e.g., in the field of lithography optics, it may therefore be preferably if exclusively monovalent alcohols whose solubility is 50 g/L (20° C.) or less, preferably 40 g/L (20° C.), more preferably 20 g/L (20° C.) or even more preferably 1 g/L (20° C.) or less are present in the polymerizable composition.

In this context, benzyl alcohol, ethylene glycol monophenyl ether or TCD alcohol M or any mixtures of these alcohols may be mentioned as examples.

The monovalent alcohol is preferably used in an amount of 10-60 wt %, more preferably 15-50 wt %, even more preferably 20-40 wt %, based on the total weight of the polymerizable composition.

In a preferred embodiment of the present invention, an arylonium salt and/or a ferrocenium salt is used as the photopolymerization initiator. Arylonium salts are preferably used for excitation in the UVA range at 350-400 nm. Ferrocenium salts are preferably used in excitation by blue light at 400-450 nm.

The arylonium salt is preferably an arylsulfonium salt. In a preferred embodiment, the photopolymerization initiator is selected from arylsulfonium hexafluoroantimonate, arylsulfonium hexafluorophosphate or mixtures thereof. Arylsulfonium hexafluoroantimonate is available, for example, as Cyracure UVI 6976 from Dow Chemical-Union Carbide. Arylsulfonium hexafluorophosphate is available, for example, as Cyracure UVI 6992 from Dow Chemical-Union Carbide. Arylsulfonium salts are generally used as solutions, e.g., approximately 50% in propylene carbonate.

When using a ferrocenium salt, it is preferably used together with cumene hydroperoxide as coinitiator. A suitable ferrocenium salt is Irgacure 261, for example, which is available from Ciba.

The photopolymerization initiator is preferably used in an amount of 1.5-10 wt %, preferably 2-8 wt %, more preferably 3-6 wt %, based on the total weight of the photopolymerizable composition. If an arylsulfonium salt such as arylsulfonium hexafluoroantimonate, arylsulfonium hexafluorophosphate is used, it is preferably present in an amount of 3 to 6 wt %, based on the total weight of the polymerizable composition.

In a preferred embodiment, the molar ratio of the epoxide groups of the cycloaliphatic epoxide to the hydroxyl groups of the monovalent alcohol is 1.0:1.0 to 4.0:1.0, more preferably 1.0:1.0 to 3.0:1.0, even more preferably 1.2:1.0 to 2.6:1.0.

The hydroxyl functionality of all organic compounds of the polymerizable composition with OH group(s) is preferably in the range of 1.0 to 1.1. Even more preferably, the hydroxyl functionality of all organic compounds of the polymerizable composition with OH group(s) is 1.0, i.e., the polymerizable composition contains only monovalent alcohols but no polyols.

In a preferred embodiment, the polymerizable composition comprises a natural resin and/or a synthetic resin. Through its presence, softening behavior and/or solubility of the thermoplastic oligomer and/or polymer obtained after polymerization can be influenced. Accordingly, solid plasticizers may also be added.

The resin preferably does not have any proton-binding functional groups. Even more preferably, the resin does not have any amine, amide, nitrile, isocyanate, nitro or carbonyl groups. These structures block the arylsulfonium salt and thus inhibit cationic UV polymerization.

Examples of suitable resins include:

synthetic resin CA, ketone resin (Hüls AG)

synthetic resin SK, ketone resin hydrogenated (Hüls AG)

Laropoal A81, aldehyde resin (BASF)

Hydrogral, hydrogenated colophony (DRT)

Dertoline P2L, colophony pentaerythrol ester (DRT).

Examples of solid plasticizers include dicyclohexyl phthalate, melting point: approximately 64° C.

glycerol tribenzoate, melting point: approximately 71° C.

neopentyl glycol dibenzoate, melting point: approximately 49° C.

1,4-cyclohexanedimethanol dibenzoate, melting point: approximately 118° C.

The resin may be selected from hydrogenated ketone resin, hydrogenated colophony or mixtures thereof. As an example of a hydrogenated ketone resin, synthetic resin SK manufactured by Degussa-Hüls may be mentioned. Hydrogral manufacturer DRT&SEEG (Willers, Engels & Co.) may be mentioned as an example of a hydrogenated colophony.

In a preferred embodiment, the polymerizable composition comprises a filler. The addition of fillers improves the rigidity of the thermoplastic oligomer and/or polymer obtained after polymerization and reduces the linear expansion coefficient. It is preferable to be sure that the incorporated fillers have a sufficient optical transparency in the excitation range of the photopolymerization initiator.

The filler is preferably selected from quartz, in particular powdered quartz, glass beads and glass fibers.

In a preferred embodiment, the surface of the filler is hydrophobized, preferably by a surface treatment with silanes, in particular with epoxy silanes and/or alkyl silanes.

To achieve a certain consistency of the polymerizable composition, highly disperse silicic acid may be incorporated into the formulation. This makes it possible to apply the polymerizable composition even to inclined and/or vertical surfaces of optical mounts (e.g., knife-edge seals) without allowing it to run away before light-curing. Highly disperse silicic acid is typically added in concentrations of 2-8 wt %, based on total weight.

The polymerizable composition may include a dye in one preferred embodiment, preferably a dye having a low absorption coefficient in the range of 360-380 nm. The dye is used primarily to make the auxiliary cement more easily detectable during the cementing process and thereby avoid interfering air bubbles in flat cement bondings. The dye is preferably present in a concentration of max. 0.1 wt %, preferably max. 0.05 wt %, based on the total weight of the polymerizable composition. A preferred dye is Sudan blue, e.g., in a concentration of max. 0.05 wt %, based on the total weight of the polymerizable composition. When using Sudan blue as the dye, its color changes from blue to faintly reddish brown during polymerization and/or the hardening reaction of the polymerizable composition. This property may be used as an indicator of hardening.

According to another aspect of the present invention, a composition is provided, comprising a thermoplastic oligomer or polymer and obtainable by oligomerization or polymerization of the polymerizable composition defined above, whereby the thermoplastic oligomer or polymer has a softening point in the range of 35° C. to 90° C., measured according to the ring-and-ball method.

The term "thermoplastic" is used in its usual sense within the scope of the present invention and refers to oligomers and polymers that can undergo reversible plastic deformation under the influence of heat.

As already mentioned above, the thermoplastic oligomer or thermoplastic polymer has an adequate adhesion effect for good fixation of an optical element on the one hand while on the other hand having adequate solubility in polar solvents for easy release at the end of processing and easy cleaning of the optical parts. Because of this thermoplastic behavior, optical components may also be separated easily and quickly from the holding devices by a defined input of heat.

The fact that formation of a thermosetting plastic is prevented and the polymerization reaction, i.e., curing reaction of the polymerizable composition defined above leads to the formation of thermoplastic oligomers and/or low-molecular weight polymers is manifested in their softening point which is determined according to the ring-and-ball method. This measurement method is based on DIN ISO 4625, but in deviation from this standard, the ring is filled only up to 2.5-3 mm high with UV auxiliary adhesive. The ring sits with the smaller diameter on the microscope slide previously treated with a silicone parting compound. The added auxiliary adhesive is cured with UVA light, intensity 40 mW/cm$^2$×120 sec (from above and/or from beneath). After a standing time of one hour, the microscope slide is removed and the ring is inserted into the test apparatus for measurement.

In a preferred embodiment, the thermoplastic oligomer or polymer has a softening point, measured according to the ring-and-ball method, in the range of 40° C. to 80° C., more preferably 40° C. to 70° C.

According to another aspect of the present invention, a method for producing a thermoplastic oligomer or polymer is made available, comprising the following steps:
    providing the polymerizable composition defined above,
    irradiating the polymerizable composition for a period of time so that a thermoplastic oligomer or a thermoplastic polymer, preferably a thermoplastic low-molecular weight polymer is obtained.

Typical irradiation conditions for light-curing epoxy adhesives are as follows, for example:
    Typical intensities 10 mW/cm$^2$ to 200 mW/cm$^2$ (depending on application), preferred intensities 20 to 50 mW/cm$^2$.
    Irradiation duration 30 sec to 300 sec (depending on application), more preferably 60 sec to 200 sec.
    Heating during light-curing is fundamentally possible (max. 80° C.), also accelerates polymerization accordingly, but should be avoided with optical items, if possible, because of the stresses.
    On parts that are sensitive to stresses, the irradiation may also be "pulsed," i.e., lighting phases alternate with dark phases through appropriate programming of the irradiation device, controlled by an aperture system (example: Bluepoint 4, Dr. Hönle AG).

The irradiation duration is preferably selected so that the thermoplastic oligomer or polymer has a softening point, measured by the ring-and-ball method, in the range of 35° C. to 90° C., more preferably 40° C. to 80° C., even more preferably 40° C. to 70° C.

In a preferred embodiment, the irradiation of the polymerizable composition takes place in the range of 280 nm to 450 nm, more preferably 350 nm to 450 nm. When using an arylonium salt as the photoinitiator, the irradiation is preferably in the range of 350 nm to 400 nm. When using a ferrocenium salt as the photoinitiator, optionally in combination with cumene hydroperoxide as coinitiator, irradiation preferably takes place in the range of 400 nm to 450 nm.

The irradiation may be performed with known radiation sources such as those generally used in the field of photopolymerization. Bluepoint 2 and/or Bluepoint 3 manufactured by Dr. Hönle AG, for example, may be mentioned here.

Mercury arc lamps have proven to be a suitable radiation source. In addition to pure mercury lamps, mercury lamps doped with metal halides are also used. For example, mercury lamps doped with iron halide are especially suitable for photoinitiators that are energized in the UVA range (approximately 340-400 nm). For excitation in the blue wavelength range (approximately 400-450 nm), however, mercury lamps doped with gallium halide, are more suitable. Modern irradiation devices are equipped with filters which suppress unwanted wavelength ranges (UVC radiation, long wavelength heat radiation). This makes it possible to cure light-curing adhesives with low stress. Irradiation of the adhesives themselves is usually accomplished by spotlights (via optical fibers) and/or by large-area radiators. As an alternative to mercury lamps, high-energy light-emitting diodes (LEDs) have also become available recently, emitting light at defined wavelengths (365 nm, 395 nm, 405 nm, 455 nm) (Panacol-Elosol GmbH, Dr. Hönle AG).

According to another aspect, the present invention relates to a method for securing and/or blocking an optical component on a holding element, comprising the following steps:
    applying the polymerizable composition defined above to the optical component and/or the holding element,
    bringing the optical component in contact with the holding element and
    irradiating the polymerizable composition for a period of time, so that a thermoplastic oligomer or thermoplastic polymer, in particular a low-molecular weight thermoplastic polymer, is obtained.

After bringing the optical component in contact with the holding element, the optical component may optionally be adjusted.

The optical component is preferably secured in a stable manner for the duration of the processing.

The optical component is preferably a lens, e.g., a semifinished eyeglass blank. Other optical components include flat optics (e.g., disks, prisms), light-permeable carrier elements and/or supporting elements on which the optics and/or ceramics are secured for the duration of processing.

The thermoplastic oligomer and/or polymer imparts an adequate adhesion between the holding element and the optical element so that the optical component remains secured in the proper position even during its processing. After processing, the bond with the thermoplastic oligomer and/or polymer can be released with no problem by the action of polar solvents, e.g., acetone and/or separated by the action of heat.

With regard to further suitable properties of the thermoplastic oligomer and/or polymer, such as softening point, reference is made to the discussion provided above.

With regard to suitable irradiation conditions such as duration, intensity or radiation source, reference is made to the preceding discussion.

According to another aspect, the present invention relates to the use of the polymerizable composition defined above for producing a thermoplastic adhesive. This adhesive comprises the thermoplastic oligomer and/or polymer defined above.

According to another aspect, the present invention relates to the use of the polymerizable composition defined above for securing and/or blocking and/or adhering optical components, e.g., lenses, in particular semifinished eyeglass blanks, or for cementing optical components, e.g., lenses and/or flat optics.

As already discussed above, when the processing time of the optical component is lengthy, e.g., in the case of polishing operations which take a longer amount of time, it may be advantageous if a hydrophobic monovalent alcohol is present in the polymerizable composition because then unwanted swelling of the cured adhesive due to uptake of water is minimized. Therefore, if the polymerizable composition defined above is used for blocking or adhering in the field of lithography optics, it is preferably if it contains only monovalent alcohols with a water solubility of 50 g/L (20° C.) or less, more preferably 40 g/L (20° C.) or less, even more preferably 20 g/L (20° C.) or less or yet even more preferably 1 g/L (20° C.) or less. For example, benzyl alcohol, ethylene glycol monophenyl ether or TCD alcohol M or any mixtures of these alcohols may be mentioned in this context.

According to another aspect, the present invention relates to the use of the polymerizable composition defined above for applying a protective layer or a protective lacquer to the surface of an optical component. This optical component may be, for example, a lens or flat optics. The protective layer and/or protective lacquering protects the optical surfaces that have already been completely polished from being damaged.

According to another aspect, the present invention relates to a method for applying a protective layer or protective lacquer to an optical component, comprising the following steps:

applying the polymerizable composition defined above to the surface of an optical component in the form of a layer or a film, irradiating the polymerizable composition for a period of time so that a thermoplastic oligomer or a thermoplastic polymer, in particular a low-molecular weight thermoplastic polymer is obtained.

The optical component may be a lens, e.g., an eyeglass lens. However, components are also provided with a protective layer during processing such that they do not constitute any original optical components, e.g., wafer stages of Zerodur in lithography systems.

With regard to the properties of the thermoplastic oligomer/polymer, reference may be made to the preceding discussion, i.e., the irradiation duration is preferably selected so that the thermoplastic oligomer or polymer has a softening point, measured by the ring-and-ball method, in the range of 35° C. to 90° C., more preferably 40° C. to 80° C., even more preferably 40° C. to 70° C.

With regard to suitable irradiation conditions such as duration, intensity or radiation source, reference may also be made to the preceding discussion.

In a preferred embodiment of the method, the polymerizable composition is diluted with a solvent that cannot be chemically involved in the photopolymerization, and then is applied to the surface of the optical component. The application is preferably accomplished by spray painting, painting with a brush or by immersion of the optical element in the solution of the polymerizable composition.

The solvent is preferably selected from aromatic hydrocarbons, in particular xylene or ethylbenzene, from ethers, in particular tetrahydrofuran or dioxane, from esters, in particular ethyl acetate or butyl acetate, from ketones, in particular methyl ethyl ketone or methyl isobutyl ketone or mixtures thereof.

The solvent is preferably evaporated before the light exposure step. This is also referred to as deaerating.

According to another aspect, the present invention relates to an optical component, in particular a lens having a surface coating containing the composition defined above with a thermoplastic oligomer or a thermoplastic polymer, in particular a low-molecular weight thermoplastic polymer.

With regard to the other properties of the thermoplastic oligomer and/or polymer, e.g., softening point, reference is made to the preceding discussion, This invention will now be explained in greater detail by the following examples.

EXAMPLES

Example 1

| | |
|---|---|
| 100 parts by weight | 3,4-epoxycyclohexylmethyl-3,4-epoxycyclohexane carboxylate (Cyracure resin UVR-6110 from Dow Chemical) |
| 80 parts by weight | hydrogenated ketone resin (synthetic resin SK from Degussa-Hüls) |
| 25 parts by weight | diethylene glycol monoethyl ether |
| 30 parts by weight | ethylene glycol monophenyl ether |
| 12 parts by weight | arylsulfonium hexafluoroantimonate (Cyracure UVI 6974 from Dow Chemical-Union Carbide) |
| 0.02 parts by weight | Sudan blue |

Molar ratio of epoxy:hydroxy = 1.83:1

Softening temperature approximately 45° C.
Curing: Bluepoint 2, mercury lamp, intensity approximately 40 mW/cm$^2$, duration 120 sec

Example 2

| | |
|---|---|
| 100 parts by weight | 3,4-epoxycyclohexylmethyl-3,4-epoxycyclohexane carboxylate (Cyracure resin UVR-6110 from Dow Chemical) |
| 50 parts by weight | hydrogenated ketone resin (synthetic resin SK from Degussa-Huls) |
| 30 parts by weight | diethylene glycol monoethyl ether |
| 20 parts by weight | TCD alcohol M (8-hydroxymethyl-tricyclo(5.2.1.0/2.6)decane) |
| 12 parts by weight | arylsulfonium hexafluoroantimonate (Cyracure UVI 6974 from Dow Chemical-Union Carbide) |
| 0.02 parts by weight | Sudan blue |

Molar ratio of epoxy:hydroxy = 2.15:1

Softening temperature approximately 50° C.
Curing: Bluepoint 2, mercury lamp, intensity approximately 40 mW/cm$^2$, duration 120 sec

Example 3

| | |
|---|---|
| 100 parts by weight | 3,4-epoxycyclohexylmethyl-3,4-epoxycyclohexane carboxylate (Cyracure resin UVR-6110 from Dow Chemical) |
| 50 parts by weight | hydrogenated colophony(Hydrogral) |
| 25 parts by weight | diethylene glycol monobutyl ether |
| 25 parts by weight | ethylene glycol monophenyl ether |
| 12 parts by weight | arylsulfonium hexafluoroantimonate (Cyracure UVI 6974 from Dow Chemical-Union Carbide) |
| 0.02 parts by weight | Sudan blue |

Molar ratio of epoxy:hydroxy = 2.21:1

Softening temperature approximately 55° C.
Curing: Bluepoint 2, mercury lamp, intensity approximately 40 mW/cm$^2$, duration 120 sec

Example 4

| | |
|---|---|
| 100 parts by weight | 3,4-epoxycyclohexylmethyl-3,4-epoxycyclohexane carboxylate (Cyracure resin UVR-6110 from Dow Chemical) |

-continued

| | |
|---|---|
| 60 parts by weight | hydrogenated ketone resin (synthetic resin SK) |
| 60 parts by weight | benzyl alcohol |
| 0.05 parts by weight | Sudan blue |
| 8 parts by weight | arylsulfonium hexafluoroantimonate (Cyracure UVI 6974 from Dow Chemical-Union Carbide) |
| 12 parts by weight | highly disperse silicic acid (thickener) |

Molar ratio of epoxy:hydroxy = 1.33:1

Softening temperature approximately 35° C.
Curing: Bluepoint 2, mercury lamp, intensity approximately 40 mW/cm², duration 120 sec Example 5

| | |
|---|---|
| 90 parts by weight | 3,4-epoxycyclohexylmethyl-3,4-epoxycyclohexane carboxylate (Cyracure resin UVR-6110 from Dow Chemical) |
| 10 parts by weight | bis-(3,4-epoxycyclohexyl) adipate (Cyracure resin UVR 6128 from Dow Chemical) |
| 80 parts by weight | hydrogenated ketone resin (synthetic resin SK from Degussa-Hulls) |
| 30 parts by weight | diethylene glycol monoethyl ether |
| 20 parts by weight | ethylene glycol monophenyl ether |
| 15 parts by weight | arylsulfonium hexafluoroantimonate (Cyracure UVI 6974 from Dow Chemical-Union Carbide) |
| 0.05 parts by weight | Sudan blue |
| 10 parts by weight | highly disperse silicic acid (thickener) |

Molar ratio of epoxy:hydroxy = 1.94:1

Softening temperature approximately 50° C.
Curing: Bluepoint 2, mercury lamp, intensity approximately 40 mW/cm², duration 120 sec Example 6

| | |
|---|---|
| 100 parts by weight | 3,4-epoxycyclohexylmethyl-3,4-epoxycyclohexane carboxylate (Cyracure resin UVR-6110 from Dow Chemical) |
| 40 parts by weight | hydrogenated ketone resin (synthetic resin SK) |
| 40 parts by weight | ethylene glycol monophenyl ether |
| 12 parts by weight | arylsulfonium hexafluoroantimonate (Cyracure UVI 6974 from Dow Chemical-Union Carbide) |
| 0.05 parts by weight | Sudan blue |

Molar ratio of epoxy:hydroxy = 2.56:1

Softening temperature approximately 75° C.
Curing: Bluepoint 2, mercury lamp, intensity approximately 40 mW/cm², duration 120 sec Example 7

| | |
|---|---|
| 100 parts by weight | 3,4-epoxycyclohexylmethyl-3,4-epoxycyclohexane carboxylate (Cyracure resin UVR-6110 from Dow Chemical) |
| 70 parts by weight | hydrogenated ketone resin (synthetic resin SK) |
| 120 parts by weight | TCD alcohol M |
| 8 parts by weight | arylsulfonium hexafluoroantimonate (Cyracure UVI 6974 from Dow Chemical-Union Carbide) |
| 0.05 parts by weight | Sudan blue |
| 0.5 parts by weight | Zonyl FSN (fluorinated wetting agent, DuPont) |

Molar ratio of epoxy:hydroxy = 1.02:1

Softening temperature approximately 45° C.
Curing: Bluepoint 2, mercury lamp, intensity approximately 40 mW/cm², duration 120 sec Example 8

| | |
|---|---|
| 100 parts by weight | 3,4-epoxycyclohexylmethyl-3,4-epoxycyclohexane carboxylate (Cyracure resin UVR-6110 from Dow Chemical) |
| 60 parts by weight | hydrogenated ketone resin (synthetic resin SK) |
| 110 parts by weight | TCD alcohol M |
| 30 parts by weight | glycerol tribenzoate (solid plasticizer) |
| 10 parts by weight | arylsulfonium hexafluoroantimonate (Cyracure UVI 6974 from Dow Chemical-Union Carbide) |
| 0.05 parts by weight | Sudan blue |

Molar ratio of epoxy:hydroxy = 1.12:1

Softening temperature approximately 45° C.
Curing: Bluepoint 2, mercury lamp, intensity approximately 40 mW/cm², duration 120 sec Example 9

| | |
|---|---|
| 100 parts by weight | Nanopox C620 (Nanoresin AG) 3,4-epoxycyclohexylmethyl-3,4-epoxycyclohexane carboxylate with approximately 40% nano-$SiO_2$ |
| 50 parts by weight | hydrogenated ketone resin (synthetic resin SK) |
| 70 parts by weight | TCD alcohol M |
| 10 parts by weight | arylsulfonium hexafluoroantimonate (Cyracure UVI 6974 from Dow Chemical-Union Carbide) |
| 0.05 parts by weight | Sudan blue |
| 250 parts by weight | powdered quartz, silanized Silbond FW 12 EST (Quarzwerke GmbH) |

Molar ratio of epoxy:hydroxy = 0.95:1

Softening temperature approximately 40° C.
Curing: Bluepoint 2, mercury lamp, intensity approximately 40 mW/Cm², duration 120 sec
Volume shrinkage approximately 1.0 vol %

Example 10

| | |
|---|---|
| 100 parts by weight | 3,4-epoxycyclohexylmethyl-3,4-epoxycyclohexane carboxylate (Cyracure resin UVR-6110 from Dow Chemical) |
| 100 parts by weight | hydrogenated ketone resin (synthetic resin SK) |
| 30 parts by weight | diethylene glycol monoethyl ether |
| 80 parts by weight | xylene |
| 50 parts by weight | dioxane |
| 12 parts by weight | arylsulfonium hexafluoroantimonate (Cyracure UVI 6976 from Dow Chemical-Union Carbide) |
| 0.05 parts by weight | Sudan blue |

Molar ratio of epoxy:hydroxy = 3.31:1

Softening temperature approximately 60° C.
Curing: Bluepoint 2, mercury lamp, intensity approximately 40 mW/cm², duration 120 sec (after venting)
Use as a protective lacquer Example 11

| | |
|---|---|
| 100 parts by weight | 3,4-epoxycyclohexylmethyl-3,4-epoxycyclohexane carboxylate (Cyracure resin UVR-6110 from Dow Chemical) |
| 100 parts by weight | hydrogenated ketone resin (synthetic resin SK from Degussa-Hulls) |
| 100 parts by weight | TCD alcohol M |
| 180 parts by weight | methyl ethyl ketone |
| 20 parts by weight | methyl isobutyl ketone |

-continued

| | |
|---|---|
| 10 parts by weight | arylsulfonium hexafluoroantimonate (Cyracure UVI 6976 from Dow Chemical-Union Carbide) |
| 0.5 parts by weight | Sudan blue |
| 1.0 part by weight | Zonyl FSN (fluorinated wetting agent) |

Molar ratio of epoxy:hydroxy = 1.23:1

Softening temperature approximately 70° C.
Curing: Bluepoint 2, mercury lamp, intensity approximately 40 mW/cm$^2$, duration 120 sec (after venting)
Use as a protective lacquer Example 12

| | |
|---|---|
| 100 parts by weight | 3,4-epoxycyclohexylmethyl-3,4-epoxycyclohexane carboxylate (Cyracure resin UVR-6110 from Dow Chemical) |
| 50 parts by weight | ketone resin (synthetic resin CA) |
| 30 parts by weight | cyclohexene oxide |
| 30 parts by weight | diethylene glycol monoethyl ether |
| 10 parts by weight | arylsulfonium hexafluoroantimonate (Cyracure UVI 6974 from Dow Chemical-Union Carbide) |
| 0.05 parts by weight | Sudan blue |

Molar ratio of diepoxy:monoepoxy = 2.07:1
Molar ratio of (residual) diepoxy:hydroxy = 1.97:1

Softening temperature approximately 60° C.
Viscosity at 25° C.: 137 mm$^2$/s (uncured)
Curing: Bluepoint 2, mercury lamp, intensity approximately 40 mW/cm$^2$, duration 120 sec

The invention claimed is:

1. A polymerizable composition for processing optical components consisting of:
an amount of a cycloaliphatic diepoxide and a cycloaliphatic monoepoxide wherein the molar ratio of the cycloaliphatic diepoxide compound to the cycloaliphatic monoepoxide compound is 1:1 to 10:1;
an amount of a monovalent alcohol having the following structure: R—(CH$_2$)$_n$—OH where n is 1 to 6, R is chosen from the group consisting of alkyl, aryl, alkoxy, and a cycloalkyl;
a photopolymerization initiator; and
a resin component chosen from the group consisting of a natural resin, a synthetic resin, and mixtures thereof, wherein the polymerizable composition forms an adhesive thermoplastic oligomer or polymer and the resin component is capable of softening the adhesive thermoplastic oligomer or polymer after polymerization; and optionally
a filler;
a highly disperse silicic acid as a consistency regulator;
a dye;
a solid plasticizer; and
wherein the ratio of the total moles of epoxide groups provided by the amount of the cycloaliphatic diepoxide and cycloaliphatic monoepoxide compounds to the total moles of hydroxyl groups provided by the amount of the monovalent alcohol is from 0.9:1.0 to 4.0:1.0; and
the hydroxyl functionality of all organic compounds of the polymerizable composition having OH group(s) is in the range of from 1.0 to 1.25.

2. The polymerizable composition according to claim 1, wherein the polymerizable composition does not contain a polyol.

3. The polymerizable composition according to claim 2, wherein the cycloaliphatic diepoxide and cycloaliphatic monoepoxide compounds are selected from 3,4-epoxycyclohexylmethyl-3,4-epoxycyclohexane carboxylate, bis(3,4-epoxycyclohexylmethyl) adipate, 2-(3,4-epoxy)cyclohexyl-5,5-spiro(3,4-epoxy)cyclohexane-1,3-dioxane, cyclohexene oxide, vinyl cyclohexene dioxide, vinyl cyclohexene monoxide, or mixtures thereof.

4. The polymerizable composition according to claim 1, wherein the softening point of a thermoplastic oligomer or polymer obtained from the polymerizable composition, measured according to the ring-and-ball method, is in the range of from 35° C. to 90° C.; and wherein R is chosen from the group consisting of an alkyl and cycloalkyl.

5. The polymerizable composition according to claim 1, wherein the photopolymerization initiator is chosen from the group consisting of an arylonium salt, a ferrocenium salt, and mixtures thereof.

6. The polymerizable composition according to claim 5, wherein the photopolymerization initiator is selected from the group consisting of an arylsulfonium hexafluoroantimonate, an arylsulfonium hexafluorophosphate, and mixtures thereof.

7. The polymerizable composition according to claim 1, wherein the molar ratio of the epoxide groups of the cycloaliphatic diepoxide and cycloaliphatic monoepoxide compounds to the hydroxyl groups of the monovalent alcohol is 1.0:1.0 to 4.0:1.0.

8. The polymerizable composition according to claim 1, wherein the hydroxyl functionality of all organic compounds of the polymerizable composition having OH group(s) is 1.0.

9. The polymerizable composition according to claim 1, wherein the resin component comprises at least one resin chosen from the group consisting of a ketone resin, a hydrogenated ketone resin, an aldehyde resin, a hydrogenated colophony, and a pentaerythrol ester colophony.

10. The polymerizable composition according to claim 1 further comprising a filler selected from the group consisting of quartz, glass beads, glass fibers and mixtures thereof and the polymerizable composition further comprises a highly disperse silicic acid as a consistency regulator.

11. The polymerizable composition according to claim 1 further comprising a dye having a low absorption coefficient in the range of 360 to 380 nm and a solid plasticizer and wherein a thermoplastic oligomer or polymer obtained from the polymerizable composition has a softening point, measured according to the ring-and-ball method, in the range of 40° C. to about 80° C.

12. The polymerizable composition according to claim 1 further comprising a solid plasticizer.

13. The polymerizable composition according to claim 9 further comprising a solid plasticizer and the resin component does not have any amine, amide, nitrile, isocyanate, nitro, or carbonyl groups.

14. The polymerizable composition according to claim 13 further comprising a highly disperse silicic acid capable of regulating the consistency of the polymerizable composition.

15. The polymerizable composition according to claim 14 further comprising a filler selected from the group consisting of quartz, glass beads, glass fibers and mixtures thereof.

16. The polymerizable composition according to claim 15, wherein the molar ratio of the epoxide groups of the cycloaliphatic diepoxide and cycloaliphatic monoepoxide compounds to the hydroxyl groups of the monovalent alcohol is 1.0:1.0 to 4.0:1.0.

17. The polymerizable composition according to claim 9 further comprising a highly disperse silicic acid capable of regulating the consistency of the polymerizable composition.

18. The polymerizable composition according to claim 1, wherein the resin component comprises a hydrogenated ketone resin, hydrogenated colophony or mixtures thereof.

19. The polymerizable composition according to claim 18 further comprising a highly disperse silicic acid capable of regulating the consistency of the polymerizable composition, a hydrophobized filler, and a solid plasticizer and wherein the molar ratio of the epoxide groups of the cycloaliphatic epoxide compound to the hydroxyl groups of the monovalent alcohol is 1.0:1.0 to 4.0:1.0.

20. The polymerizable composition according to claim 1, wherein the monovalent alcohol comprises at least one monovalent alcohol chosen from the group consisting of: ethylene glycol monoalkyl ether, diethylene glycol monoalkyl ether, ethylene glycol monoaryl ether, diethylene glycol monoaryl ether, n-hexanol, n-octanol, methoxybutanol, benzyl alcohol, TCD alcohol M (8-hydroxymethyltricyclo [$5.2.1.0^{2,6}$]decane), cyclohexylmethanol, 2-cyclohexylethanol, and 4-methoxybenzyl alcohol.

* * * * *

UNITED STATES PATENT AND TRADEMARK OFFICE
CERTIFICATE OF CORRECTION

PATENT NO. : 9,540,482 B2  
APPLICATION NO. : 12/209907  
DATED : January 10, 2017  
INVENTOR(S) : Weippert Page 1 of 1

It is certified that error appears in the above-identified patent and that said Letters Patent is hereby corrected as shown below:

In the Specification

Column 2, Line 23:
"tenses" should be --lenses--.

Column 4, Line 22:
after "thereof" insert --,--.

Signed and Sealed this
Eleventh Day of April, 2017

Michelle K. Lee
*Director of the United States Patent and Trademark Office*